United States Patent [19]

Bella, Jr.

[11] 3,963,424

[45] June 15, 1976

[54] COOLING AQUEOUS ALKALI METAL HYDROXIDE LIQUORS BY VACUUM EVAPORATION WITH SUBSEQUENT SOLIDS PRECIPITATE REMOVAL

[75] Inventor: Frank Bella, Jr., South Holland, Ill.

[73] Assignee: Whiting Corporation, Harvey, Ill.

[22] Filed: May 14, 1973

[21] Appl. No.: 359,985

[52] U.S. Cl. ........................... 23/296; 159/45; 159/47 WL; 202/185 A; 423/183; 423/184; 203/91; 23/303
[51] Int. Cl.² ........................... B01D 9/00
[58] Field of Search ............ 23/302, 303, 306, 296, 23/312 R; 423/183, 180, 641, 184; 204/98; 202/185 A, 182–184, 175; 203/42, 91; 62/478; 159/27 A, 17 VS, 23, 45, 47

[56] References Cited
UNITED STATES PATENTS

| | | | |
|---|---|---|---|
| 959,730 | 5/1910 | Gabriel | 204/98 |
| 1,598,935 | 9/1926 | Robison | 23/303 |
| 1,944,548 | 1/1934 | Ebner | 23/296 |
| 1,996,053 | 4/1935 | Black et al. | 23/302 |
| 2,393,108 | 1/1946 | Kokatnur | 23/302 |
| 2,555,340 | 6/1951 | Hopper et al. | 23/296 |
| 2,573,516 | 10/1951 | Van Der Molen | 23/296 |
| 2,718,458 | 9/1955 | Browning | 23/302 |
| 2,876,182 | 3/1959 | Hopper et al. | 23/303 |
| 3,402,113 | 9/1968 | Tsao | 204/98 |
| 3,560,168 | 2/1971 | Stanton et al. | 23/302 |

OTHER PUBLICATIONS
The Electrochemical Society Preprint 86-24, Oct. 12-14, 1944, Buff. N.Y., pp. 265-275.

*Primary Examiner*—Frank W. Lutter
*Assistant Examiner*—Frank Sever
*Attorney, Agent, or Firm*—Lockwood, Dewey, Zickert & Alex

[57] ABSTRACT

A method and apparatus for cooling aqueous alkali metal hydroxide liquors such as, for example, caustic soda liquors, involving the vacuum cooling of a body of such liquor in an evaporating chamber having a overhead vapor outlet which communicates with a direct-contact barometric condenser supplied with a stream of cooled alkali metal hydroxide liquor. The cooled alkali metal hydroxide liquor has a vapor pressure below the absolute pressure of water vapor evolved from the body of liquor in the evaporating chamber and condenses the water vapor upon contact therewith. A stream of cooled concentrated alkali metal hydroxide liquor withdrawn from the evaporating chamber is, in accordance with a preferred embodiment of the present invention, further cooled and solids contained therein, such as, for example, sodium chloride crystals, are then removed in a suitable liquid-solids separation device. At least a portion of the substantially solids-free liquor from the liquid-solids separation device is then transmitted to the direct-contact barometric condenser for use as the condensing medium.

18 Claims, 1 Drawing Figure

U.S. Patent  June 15, 1976  3,963,424
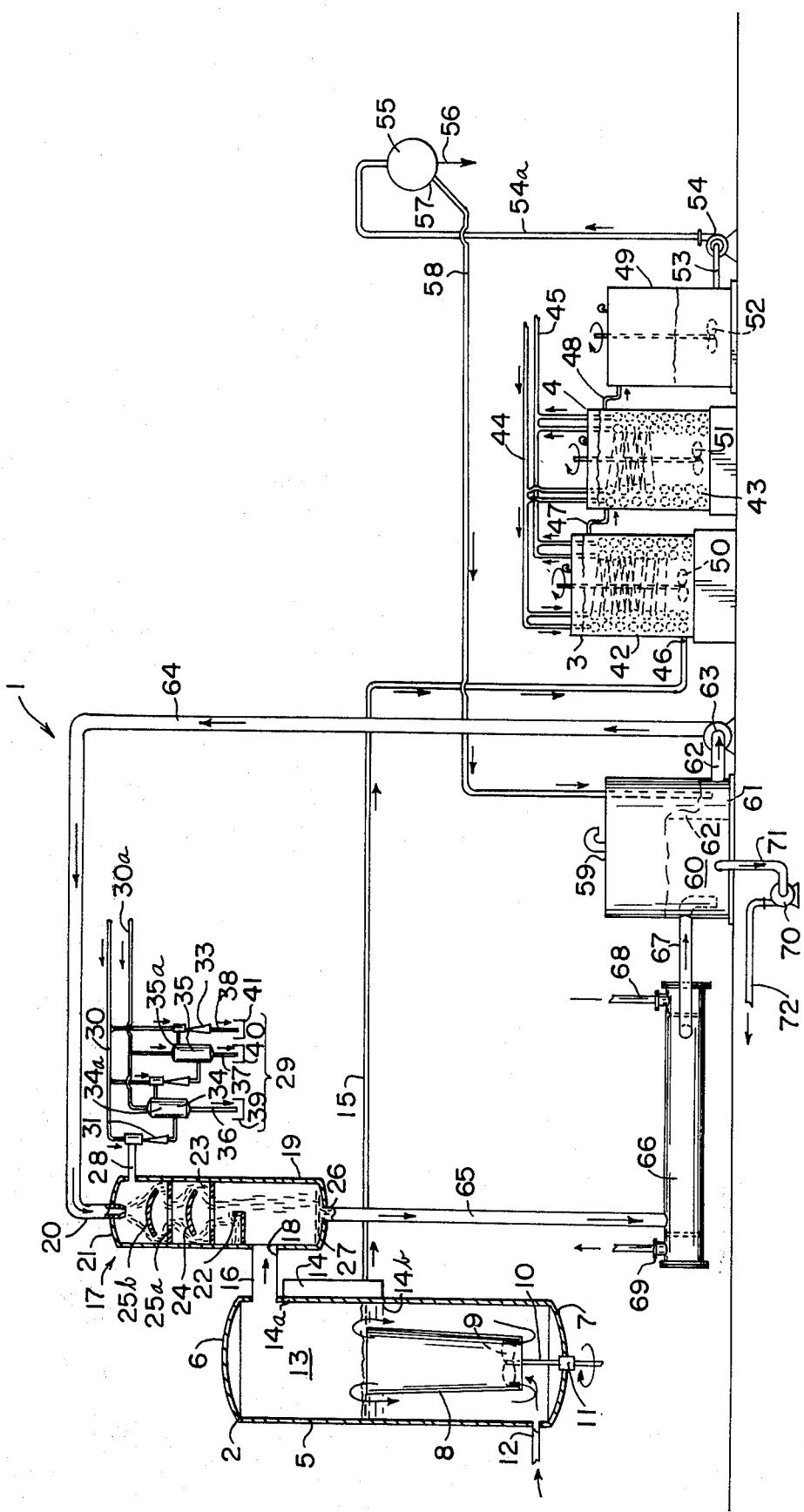

COOLING AQUEOUS ALKALI METAL HYDROXIDE LIQUORS BY VACUUM EVAPORATION WITH SUBSEQUENT SOLIDS PRECIPITATE REMOVAL

The present invention generally relates to an improved method and apparatus for cooling aqueous alkali metal hydroxide liquors and, more particularly, to a method and apparatus for vacuum cooling caustic soda liquors with minimal steam requirements. In this regard, an important embodiment of the present invention is specifically directed to a method and apparatus for vacuum cooling diamphragm cell caustic soda liquor in an evaporator which is equipped with a direct-contact barometric condenser wherein a cooled caustic soda liquor having aa reduced salt concentration is contacted with water vapor evolved from the liquor body in the evaporating chamber to condense such water vapor.

In the manufacture of diaphragm cell caustic soda, the produce produced in the diaphragm cells typically contains approximately 10% sodium hydroxide which is initially concentrated in an evaporator to produce a liquor having a sodium hydroxide concentration of from approximately 49% to 51% by weight. The temperature of the evaporator product typically ranges from approximately 180°F. to 200°F. and is usually contaminated with appreciable amounts of sodium chloride, both in the form of dissolved sodium chloride and sodium chloride crystals. Before this product is commercially usable, both the sodium chloride content and temperature thereof should be reduced, preferably to provide a caustic soda product having a dissolved sodium chloride content of about 1% by weight or less and a temperature of 115°F. or less.

Conventionally, cooling of the caustic soda liquor from the evaporator is done in at least two stages, primarily because the temperature of plant water is often higher than 75°F. In such instances, plant water is used for initial cooling of the caustic liquor in a first stage cooling operation and chilled water is used for final cooling of the caustic liquor in a second stage cooling operation. One conventional technique for achieving this two-stage cooling operation involves the processing of the evaporator caustic soda liquor in an agitated-tank cooling system which typically would consist of from two to six atmospheric tanks, each of which is equipped with a mixer and pipe coils through which a suitable coolant is circulated. The caustic soda liquor flows through these tanks in series, by gravity, with plant water being used as the cooling medium in the tank or tanks which comprise the initial cooling stages and chilled water being used in the remaining tanks.

Forced-circulation cooling systems have also been used to cool caustic soda liquors. As is true of the agitated-tank systems described above, these systems typically include multiple stages. In each stage, an atmospheric retention tank, heat exchanger, circulating pump and associated piping is used. Caustic soda liquor is circulated from the retention tank, through the tube side of the heat exchanger, and back into the retention tank. A suitable coolant such as plant water or chilled water is used as the cooling medium on the shell side of the heat exchanger.

Vacuum cooling systems have also been employed in the cooling of caustic soda liquors. Typically, these conventional vacuum systems consist of one or more stages wherein the caustic soda liquor is cooled by evaporation of the water at a subatmospheric pressure. Each stage can include a vacuum vessel which is agitated with a suitable internal mixer or an external circulating pump. Subatmospheric pressure in each of the vacuum vessels is usually maintained by a conventional multiple-stage steam-jet system.

While the agitated-tank cooling systems described above have achieved popularity as a result of their being relatively inexpensive to manufacture and operate, they have been characterized by excessive salt build ups on the outside of the pipe coils due to the relatively large temperature differential between the cooling water and the caustic. Accordingly, fouling of the coolant coils therein occurs at relatively frequent intervals necessitating shutdown of the equipment and cleaning.

The wash-out cycles for forced-circulation coolers are generally longer than those for the agitated-tank cooler systems described above if the temperature differential for the forced circulation unit is kept relatively low, however, these coolers are characterized by the disadvantages of being more expensive than the agitated-tank coolers both with regard to installation and operating costs. For example, power requirements for a forced-circulation cooler will commonly be in the order of ten times greater than those of agitated-tank cooler systems.

As a result of the disadvantages of the surface-type cooling systems described above, vacuum cooling represents an ideal method for at least initial cooling of caustic soda since it avoids the presence of cooling surfaces which tend to become fouled. Conventional vacuum cooling of caustic soda liquors, however, has not achieved popularity primarily because of the high steam requirements necessary to compress water vapor evaporated in the evaporating chamber to a sufficient pressure so that it can be condensed by plant water in the condenser.

The present invention overcomes the disadvantages of the previously described conventional systems in that it provides a method and apparatus by which alkali metal hydroxide liquors, particularly diaphragm cell caustic soda liquor, can be cooled in a two-stage cooling operation including an initial vacuum cooling stage characterized by minimal steam requirements and a subsequent atmospheric agitated tank-type cooling stage characterized by smaller temperature differentials and reduced heat exchanger surface areas. In accordance with the method and apparatus of the present invention, an aqueous alkali metal hydroxide liquor such as, for example, caustic soda liquor, is introduced into a vacuum cooling stage which includes an evaporating chamber having an overhead vapor outlet which directly communicates with a direct-contact barometric condenser supplied with a stream of cooled alkali metal hydroxide liquor. The cooled alkali metal hydroxide liquor has a vapor pressure below the absolute pressure of the water vapor evolved from the body of liquor in the evaporating chamber and condenses the water vapor upon contact therewith. A stream of cold concentrated alkali metal hydroxide liquor is withdrawn from this initial cooling stage and then further cooled in the secondary cooling stage which, in accordance with a preferred embodiment of the present invention, includes a plurality of atmospheric agitated-tank coolers supplied with plant water and/or chilled water as the cooling medium. The stream of further cooled alkali metal hydroxide liquor withdrawn from this secondary cooling stage is then processed for solids removal in a suitable liquid-solids separation device. At least a portion of the substantially solids-free liquor removed from the liquid-solids separation device is then transmitted to the direct-contact barometric condenser for use as the condensing medium in the initial cooling stage.

It is, therefore, a general object of the present invention to provide an improved method and apparatus for cooling aqueous alkali metal hydroxide liquors.

Another object of the present invention is to provide an improved method and apparatus for processing aqueous alkali metal hydroxide liquors such as, for example, caustic soda liquor, to both cool the same and reduce the salt concentration thereof.

Another object of the present invention is to provide an improved method and apparatus for vacuum cooling alkali metal hydroxide liquors, particularly caustic soda liquors, wherein minimum amounts of steam are required.

Another object of the present invention is to provide an improved method and apparatus for condensing water vapor evolved from a body of alkali metal hydroxide liquors which includes directly contacting such water vapor with a liquid stream of cooled alkali metal hydroxide liquor having a vapor pressure below the absolute pressure of the water vapor.

Another object of the present invention is to provide an improved method and apparatus for vacuum cooling diaphragm cell caustic soda liquor in an evaporator equipped with a direct-contact barometer condenser supplied with cooled caustic soda as the condensing medium.

Another object of the present invention is to provide an improved method and apparatus for cooling alkali metal hydroxide liquors, particularly the caustic soda liquors, wherein an initial vacuum cooler characterized by minimal steam requirements is cooperatively used with a second cooling step which includes atmospheric tanks equipped with cooling coils characterized by reduced heat exchanger surfaces and lower temperature differentials, thereby substantially reducing salt build up on the cooling coils.

These and other objects of the present invention will be apparent from a detailed description of the present invention taken in conjunction with the accompanying drawing which illustrates a diagrammatic view of an installation for cooling aqueous alkali metal hydroxide liquors in accordance with the present invention.

Referring to the drawing, a system for cooling diaphragm cell caustic soda embodying features of the present invention is generally designated by the reference numeral 1. In accordance with a preferred embodiment of this invention, this system incorporates an initial cooling stage having a vacuum cooler 2 and a second cooling stage which includes a plurality of atmospheric agitated tank coolers 3 and 4. It should be noted that while the method and apparatus of the present invention are particularly suited to cooling of diaphragm cell caustic soda, it can be used to cool other alkali metal hydroxide liquors such as, for example, potassium hydroxide liquors.

In the illustrated embodiment, the vacuum cooler 2 includes a fixed diameter body section 5 which is enclosed at its upper and lower ends by domed end sections 6 and 7, respectively. In order to insure uniformity of temperature and concentration conditions within the slurry contained within the vacuum cooler 2, a suitable forced circulation and flow direction control means can be provided. For example, in the illustrated embodiment an open ended draft tube 8 which is secured to the interior vessel in a known manner is provided in conjunction with an impeller blade 9 which is supported on a centrally disposed drive shaft 10 which, in turn, is journaled in a suitable bearing and seal arrangement generally designated by the reference numeral 11. Drive shaft 10 extends outwardly of the lower end of the vacuum cooler 2 and is driven by a drive means (not illustrated). The impeller 9 operates to draw the slurry upwardly through the draft tube 8 and then along the outer periphery of the draft tube between the annular space defined by the outer surface of the draft tube 8 and the interior of the fixed diameter body portion 5. While the vacuum cooler 2 shown in the illustrated embodiment is in the form of a draft-tube crystallizer, it will be appreciated that other forms of vacuum cooling vessels may be substituted in place thereof such as, for example, a forced-circulation evaporator vessel of the type wherein an external circulating pump provides the desired mixing.

Liquor which is fed to the vacuum cooler 2 is introduced through an inlet 12 preferably located at the lower end of the vacuum cooler 2 adjacent the lower end of the draft tube 8 and impeller 9 so that it is uniformly dispersed throughout the circulating body of slurry contained in the cooler 2 as quickly as possible.

As shown, the level of alkali metal hydroxide liquor and crystals suspended in vacuum cooler 2 is preferably maintained just slightly above the upper end of the draft tube 8 to define an enclosed freeboard space 13 which is maintained at a subatmospheric pressure. A vertical side tube 14 having an upper end 14a which communicates with the freeboard space 13 and a lower end 14b communicating with the body of liquor contained in the vessel receives liquor to be withdrawn from the vessel 2 for discharge through an outlet line 15 for further processing.

In accordance with an important aspect of the present invention, the upper end of the vacuum cooler 2 is provided with a vapor outlet line 16 which communicates directly with a direct-contact barometric condenser 17 which is supplied with a cooler alkali metal hydroxide liquor as the condensing medium. In the illustrated embodiment, direct-contact barometric condenser 17 is of the counter-current flow type, namely, the type wherein liquid flow of the condensing medium is downward and the flow of the vapors to be condensed is upward. It will be appreciated, however, that other forms of direct-contact barometric condensers such as, for example, concurrent flow condensers as well as those equipped with spray devices for the condensing medium, could be used without departing from the present invention.

As shown, the direct-contact barometric condenser includes a vapor inlet 18 which is provided adjacent the lower end of the fixed diameter body section 19. Flow of the incoming liquid condensing medium is introduced adjacent the upper end through a centrally disposed opening 20 in the upper plate 21. A plurality of flow direction and diverter plates are provided to insure intimate contact of the vapors to be condensed with the condensing medium. In this regard, it will be appreciated that condensing will occur in the direct-contact barometric condenser by virtue of the condensation of the higher vapor pressure material (the vapor emitted from the vacuum cooler) onto the lower vapor pressure material (the condensing medium). The particular flow diverter arragement in the illustrated direct-contact barometric condenser includes an overhead inlet canopy plate 22, a centrally open lower annular plate 23, a centrally located dished lower diverter plate 24, a centrally open upper annular plate 25a and a centrally located dished upper diverter plate 25b, each of which is mounted to the interior of the direct-contact barometric condenser 17 in known manner. Accordingly, in the illustrated embodiment, flow of the liquid condensing medium received in the central opening 20 will be discharged onto and downwardly from the dished diverter plate 25b, through the central opening in annular plate 25a onto the upper portion of the dished diverter plate 24 and flow downwardly therefrom to provide a curtain of liquid condensing medium which then collects on the outward portions of the annular plate 23 and downwardly through the central opening portion thereof collecting adjacent the lower end of the direct-contact barometric condenser 17 for discharge through the opening 26 in the lower end plate 27 thereof.

The non-condensables from the direct-contact barometric condenser are discharged through an outlet 28 located adjacent the upper end thereof into a three-stage air ejector system generally designated by the reference numeral and bracket 29. The three-stage air ejector system 29 can be of conventional design. For example, in the illustrated embodiment, high pressure steam is introduced through a line 30 into each of three ejectors 31, 32 and 33. Ejectors 31 and 32, respectively communicate with the lower ends of direct-contact barometric condensers 34 and 35, each of which communicates with a supply line 30a for receiving a suitable condensing liquid such as, for example, plant water adjacent the upper ends 34a and 35a thereof. Liquids from the condensers 34 and 35 are discharged through tailpipes 36 and 37, respectively, while discharge from the ejector 33 is transmitted to a similar tailpipe 38. Tailpipes 36, 37 and 38 respectively discharge into a sealed hotwell 39, 40 and 41 as diagrammatically shown in the FIGURE.

Cooled alkali metal hydroxide liquor and the solids suspended therein are transmitted via outlet line 15 into the agitated atmospheric tank coolers 3 and 4 which are arranged in series and respectively equipped with cooling pipe coils 42 and 43. These cooling pipe coils are supplied with cooling water through inlet 44 which cooling water is discharged therefrom through outlet line 45. As shown, the alkali metal hydroxide liquor can be introduced adjacent the lower end of atmospheric cooling tank 3 at an inlet 46 and is transferred from tank 3 via an outlet 47 into the cooling tank 4. Upon being cooled in tank 4, the material can be transmitted via outlet line 48 into a surged tank 49. As shown, the agitated tank coolers 3 and 4 and the surge tank 49 are respectively equipped with suitable mixers, e.g. stirring impellers 50, 51 and 52, for maintaining uniformity of the slurry contained therein.

Cooled alkali metal hydroxide liquor is then discharged via outlet pipe 53 from the surge tank 49 into a centrifugal pump 54 from which it is pumped through line 54a into a suitable liquid-solids separation device 55 (e.g. a solid bowl centrifuge, pressure leaf filter or equivalent device) wherein solids such as, for example, sodium chloride crystals which are contained in the cooler liquor are separated therefrom and discharged through a solids outlet 56 so that a substantially solids-free liquor product is produced and discharged via liquids outlet 57 into a filtrate line 58.

The cooled alkali metal hydroxide liquor is transmitted via filtrate line 58 into a hotwell 59 which, as shown, can be subdivided into liquid compartments 60 and 61 by means of a vertically extending divider wall 62. In the illustrated embodiment, the cooled alkali metal hydroxide liquor which is substantially solids-free is discharged into compartment 61 of the hotwell 59 and transferred therefrom through outlet line 62 by centrifugal pump 63 into direct-contact barometric condenser feedline 64. In this manner, a stream of cooled alkali metal hydroxide liquor is supplied to the direct-contact barometric condenser so that the cooled alkali metal hydroxide liquor can act as the condensing medium therein.

Alkali metal hydroxide liquor containing the condensables collected in the vacuum cooler 2 is, as previously noted, discharged through opening 26 in the direct-contact barometric condenser into a condenser discharge line 65 and then cooled to the desired product temperature. In the illustrated embodiment, condenser discharge line 65 communicates with the shell inlet side of a liquid-to-liquid heat exchanger 66 wherein the alkali metal hydroxide liquor is cooled and then supplied into compartment 60 of the hotwell 59 via a supply line 67. The cooling medium (e.g. plant water) supplied to the heat exchanger 66 is introduced into the tube side thereof via inlet 68 and is discharged therefrom via outlet 69. If desired, the alkali metal hydroxide liquor could be supplied to the tube side of heat exchanger 66 and the cooling medium to the shell side thereof.

Product which is substantially solids-free and cooled in accordance with the present invention can be withdrawn from the hotwell 59 by means of a centrifugal pump 70 or equivalent forced circulation device having an inlet connection 71 to the hotwell 59 and a discharge connection 72 for supplying the product to a suitable storage area or to other equipment for further processing as desired.

The present invention will now be specifically described in conjunction with the following illustrative working example which is directed to the application of the present invention to the cooling of diaphragm cell caustic soda.

EXAMPLE

A feed mixture comprising 100,000 pounds per hour of 49.5% (by weight) sodium hydroxide liquor and 3,170 pounds per hour of sodium chloride crystals at a temperature of 191°F. is supplied to the vacuum cooler 2 from an evaporator which, in accordance with conventional practices, has initially received a diaphragm cell caustic soda containing approximately 10% sodium hydroxide to produce this feed liquor.

An absolute pressure of 0.248 in. Hg is maintained in the freeboard space 13 of cooler 2 resulting in the cooling of the feed mixture to 124°F. 4,120 pounds of the water are evaporated and 1,380 pounds per hour of sodium chloride crystals are precipitated, resulting in an increase in the sodium hydroxide concentration of the liquor from 49.5% to 52.4%. Accordingly, the flow through outlet line 15 constitutes approximately 94,500 pounds per hour of liquor and 4,550 pounds per hour of sodium chloride crystals at a temperature of 124°F.

The liquor and sodium chloride crystals are then further cooled and processed in agitated-tank coolers 3 and 4 and surge tank 49 wherein the liquor temperature is reduced to 90°F. and an additional 410 pounds of sodium chloride crystals are precipitated, resulting in an increase in the caustic soda concentration of the liquor from 52.4% to 52.6%.

After cooling, the liquor and salt crystals are supplied to the liquids-solids separation device 55 wherein approximately 4,840 pounds per hour of salt crystals are removed and a filtrate containing approximately 52.6% NaOH at a temperature of 90°F. is discharged therefrom into filtrate line 58. This cooled caustic soda is then introduced into the hotwell 59 wherein it mixes with caustic soda in the condenser circulating circuit. The resultant mixture contains approximately 50.4% sodium hydroxide at 103.8°F. is the pumped into the direct contact barometric condenser 17 to condense the vapors generated in the vacuum cooler 2.

The condenser discharge transmitted through outlet 26 contains approximately 50.2% sodium hydroxide at 110°F. This liquor is cooled in the shell side of the heat exchanger 66 to a temperature of approximately 105°F. The heat exchanger is supplied with cooling water having a 90°F. maximum temperature which undergoes approximately a 5° temperature increase during the heat exchange process.

The 50.2% sodium hydroxide liquor having a temperature of 105°F. which is produced in accordance with the present invention and stored in compartment 60 of hotwell 59 is cool enough to store in steel equipment and typically will be stored in caustic soda storage tanks until further use thereof is desired.

In this illustrative example, the high pressure steam line 30 of the three-stage air ejector 29 is supplied with 1,400 pounds per hour of 90 psig steam and the liquid condensing medium line 30a is supplied with 300 gallons per minute of 90°F. water. The cooling load for the heat exchanger in this condenser circuit is then 4,250,000 Btu/hour. Similarly, the cooling load for the agitated-tank coolers is approximately 2,437,000 Btu/hour.

It is interesting to compare the foregoing with the steam requirements for a conventional vacuum cooler which utilizes water as the condensing medium instead of an aqueous alkali metal hydroxide liquor. The total steam requirements required to achieve the cooling obtained as previously described would range from 13,000 pound per hour of 90 psig steam for a one stage system to 6,800 pounds per hour of 90 psig for a four stage system.

If conventional atmospheric agitated tank or forced circulation coolers were used to cool the caustic soda described in the example, the caustic soda would need to be cooled to 75°F. to attain the same dissolved salt content as that obtained in the liquor discharged from the invention at 90°F. This is because the caustic soda concentration from the proposed system is greater than that from conventional atmospheric, surface-type coolers due to the evaporation of water during vacuum cooling. At the same temperature, the dissolved salt content decreases as the caustic soda concentration increases. Systems embodying the present invention, therefore, require a lower cooling load than that for conventional atmospheric, surface-type coolers. In the operating conditions of this example, if conventional agitated-tank or forced circulation coolers were used to cool the caustic soda described from 191°F. to 75°F., the total cooling load for the heat exchanger surface would be 8,949,000 Btu/hour which is approximately 34% more than the 6,687,00 Btu/hour total required for the above described system of the present invention.

While in the foregoing specification many details of the present invention have been set forth, it will be apparent to those skilled in the art that many of these details can be varied without departing from the spirit and scope of this invention. Accordingly, the present invention is to limited only by the scope of the appended claims.

I claim:

1. The process of treating an aqueous caustic soda liquor-solids slurry having a dissolved sodium chloride concentration of at least 1.5% by weight to reduce the temperature and the sodium chloride concentration thereof, said process comprising the steps of: feeding said aqueous caustic soda liquor-solids slurry to a body of said liquor contained in an initial cooling stage which includes an evaporating chamber maintained at a subatmospheric pressure and equipped with means for circulating said liquor body in a flow pattern adapted to maintain substantial uniformity of concentration throughout said liquor body wherein water vapor is evolved from said slurry body; contacting said evolved water vapor with a stream of relatively solids-free aqueous caustic soda liquor having a temperature and dissolved sodium chloride content below that of said aqueous caustic soda liquor-solids slurry feed and a vapor pressure below the absolute pressure in said evolved water vapor in a vessel which is in direct communication with said evaporating chamber; withdrawing a liquid caustic soda-solids slurry stream from said body of caustic soda liquor in said evaporating chamber, said withdrawn steam having a temperature below the temperature of said caustic soda-solids slurry feed; cooling said withdrawn caustic soda liquor-solids slurry stream in a second cooling stage, withdrawing a stream of further cooled caustic soda liquor-solids slurry from said cooling stage, said withdrawn stream of further cooled caustic soda liquor-solids slurry having a solids constituent which includes sodium chloride crystals; feeding said further cooled caustic soda liquor-solids slurry into a liquid-solids separation device wherein a substantial portion of the solids constituent thereof is removed therefrom to produce a relatively solids-free caustic soda liquor; removing said relatively solids-free caustic soda liquor from a first outlet in said liquids-solids separation device, said liquid-solids separation device also including a second outlet through which the solids constituents removed from the slurry are discharged; and, supplying at least a portion of said relatively solids-free caustic soda liquor to said vessel for contact with said water vapor.

2. The process of claim 1 wherein said second cooling stage includes at least one atmospheric tank equipped with cooling coils through which a coolant is circulated.

3. The process of claim 1 wherein the temperature of said caustic soda liquor-solids slurry feed is at least 160°F. and the dissolved sodium chloride content thereof is at least 2.0%.

4. The process of claim 3 wherein the temperature of the slurry withdrawn from said evaporating chamber ranges from approximately 120°F. to 150°F.

5. The process of claim 4 wherein the temperature of said stream of further cooled caustic soda slurry withdrawn from said second cooling stage is below 100°F.

6. The process of claim 5 wherein said vessel is a direct contact barometric condenser.

7. Apparatus for treating aqueous caustic soda liquor to reduce the temperature and sodium chloride concentration thereof, said apparatus comprising: an initial cooling stage which includes an evaporating chamber, means for feeding an aqueous caustic soda liquor-solids slurry to a body of said slurry contained in said evaporating chamber, means for maintaining said evaporating chamber at a subatmospheric pressure, means for circulating said body of slurry in said evaporating chamber in a predetermined flow pattern, said evaporating chamber being at least partially enclosed to define a zone into which water vapor is evolved from said slurry body, said initial cooling stage also including a direct-contact condenser in communication with said zone, supply means for supplying a stream of relatively solids-free aqueous caustic soda liquor as a condensing medium to said direct-contact barometric condenser whereby water vapor evolved from said body will be contacted with said stream of relatively solids-free aqueous caustic soda liquor to condense at least a portion of said vapor, means for withdrawing a cooled caustic soda liquor-solids slurry stream from said evaporating chamber, means for feeding said withdrawn cooled caustic soda liquor-solids slurry stream to a second cooling stage, a liquid-solids separation means in communication with said second cooling stage, means for withdrawing a stream of further cooled caustic soda liquor-solids slurry from said second cooling stage, means for feeding said withdrawn stream of further cooled caustic soda liquor-solids slurry into said liquid-solids separation means, first outlet means for removing a relatively solids-free cooled caustic soda liquor from said liquid-solids separation means, second outlet means through which the solids constituents removed from said slurry by said separation means are discharged, and means communicating said first outlet means with said supply means for feeding at least a portion of said relatively solids-free caustic soda liquor to said direct-contact condenser means.

8. The apparatus of claim 7 wherein said second cooling stage includes at least one atmospheric tank equipped with cooling coils through which a coolant is circulated.

9. The process of cooling an aqueous alkali metal hydroxide liquor-solids slurry to reduce the temperature of said slurry and remove solids impurities which include alkali metal salts from said slurry, comprising the steps of: feeding said slurry to an initial cooling stage which includes an evaporating chamber maintained at a subatmospheric pressure wherein water vapor is evolved from said slurry; withdrawing a stream of cooled alkali metal hydroxide liquor-solids slurry from sid evaporating chamber; feeding said cooled slurry to a second cooling stage, further cooling said cooled slurry in said second cooling stage, feeding said further cooled slurry into a liquid-solids separation device wherein a substantial portion of the solids constituents in said slurry are removed to produce a relatively solids-free alkali metal hydroxide liquor; removing said relatively solids-free alkali metal hydroxide liquor from a first outlet in said liquids-solids separation device, said liquids-solids separation device also including a second outlet through which the solids constituents removed from said slurry are discharged; and, contacting the water vapor evolved from said evaporating chamber with at least a portion of said cooled relatively solids-free alkali metal hydroxide liquor removed from said first outlet of said liquid-separation device in a vessel which is in communication with said evaporating chamber, said cooled relatively solids-free alkali metal hydroxide liquor having a vapor pressure below the absolute pressure of said water vapor, whereby said water vapor condenses upon contact therewith.

10. The process of claim 9 wherein said further cooling of said stream of alkali metal hydroxide liquor includes flowing said liquor through an atmospheric tank equipped with coils through which a coolant is circulated.

11. The process of claim 9 wherein said alkali metal hydroxide liquor is caustic soda.

12. The process of claim 11 wherein said vessel is a direct contact barometric condenser.

13. In the process of cooling an aqueous alkali metal hydroxide liquor-solids slurry wherein said slurry is initially introduced into a vessel maintained at a subatmospheric pressure and said slurry is initially cooled by evaporation of water vapor therefrom, a stream of cooled slurry is removed from said vessel and then fed to a second cooling stage in which said cooled slurry stream is further cooled, and a stream of further cooled slurry is withdrawn from said second cooling stage, the improvement comprising discharging said water vapor from said vessel into a direct contact barometric condenser, supplying said condenser with a liquid stream of alkali metal hydroxide liquor condensing medium, said liquor having a vapor pressure below the absolute pressure of said water vapor evolved from said liquor body, said liquid stream of alkali metal hydroxide liquor comprising a relatively solids-free liquor separated from said further cooled stream of said slurry in a liquids-solids separation device whereby said water vapor is condensed upon contact with said liquid stream in said condenser.

14. The improvement of claim 13 wherein said alkali metal hydroxide is sodium hydroxide.

15. Apparatus for cooling an aqueous alkali metal hydroxide liquor-solids slurry comprising: an evaporating chamber, an inlet for feeding said slurry to said evaporating chamber, said evaporating chamber being at least partially enclosed to define a zone into which water vapor from said slurry body is evolved, vacuum means for maintaining a subatmospheric pressure in said zone, direct-contact condenser means in communication with said zone for receiving water vapor evolved from said slurry body, supply means for supplying a stream of relatively solids-free alkali metal hydroxide liquor to said direct-contact condenser means, means for withdrawing a stream of cooled alkali metal hydroxide liquor-solids slurry from said evaporating chamber, cooling means for further cooling the cooled alkali metal hydroxide liquor-solids slurry withdrawn from said evaporating chamber, means for feeding said cooled alkali metal hydroxide liquor-solids slurry to said cooling means, a liquids-solids separation device, means for feeding said further cooled alkali metal hydroxide liquor-solids slurry stream from said cooling means to said separation device, said device including means for removing a substantial portion of the solids constituents in said slurry to produce a relatively solids-free alkali metal hydroxide liquor, first outlet means in said separation device for removing said relatively solids-free alkali metal hydroxide liquor from said separation device, second outlet means in said separation device through which the solids constituents removed from said slurry are discharged, and means communicating said first outlet with said supply means.

16. The apparatus of claim 15 wherein said evaporating chamber includes means for continuously circulating said slurry body in a predetermined flow pattern.

17. The apparatus of claim 15 wherein said means for circulating said liquor body includes a flow directing means mounted within said evaporating chamber and a forced circulation means.

18. The apparatus of claim 17 wherein said flow directing means comprises an open ended draft tube.

* * * * *

UNITED STATES PATENT AND TRADEMARK OFFICE
CERTIFICATE OF CORRECTION

PATENT NO. : 3,963,424
DATED : June 15, 1976
INVENTOR(S) : Frank Bella, Jr.

It is certified that error appears in the above-identified patent and that said Letters Patent are hereby corrected as shown below:

In the Abstract, line 4, "a" should read --an--

Column 1, line 13, "diamphragm" should read --diaphragm--

Column 1, line 16, "aa" should read --a--

Column 3, line 31 "barometer" should read --barometric--

Column 9, line 58, "sid" should read --said--

Signed and Sealed this

Eighteenth Day of October 1977

[SEAL]

Attest:

RUTH C. MASON
*Attesting Officer*

LUTRELLE F. PARKER
*Acting Commissioner of Patents and Trademarks*